Oct. 2, 1962 E. GUENTHER 3,056,278
FLOW CONTROLLER FOR CHROMATOGRAPHIC ANALYZER
Filed Feb. 17, 1960 3 Sheets-Sheet 1

INVENTOR.
EMMERICH GUENTHER
BY Hudson & Young
ATTORNEYS

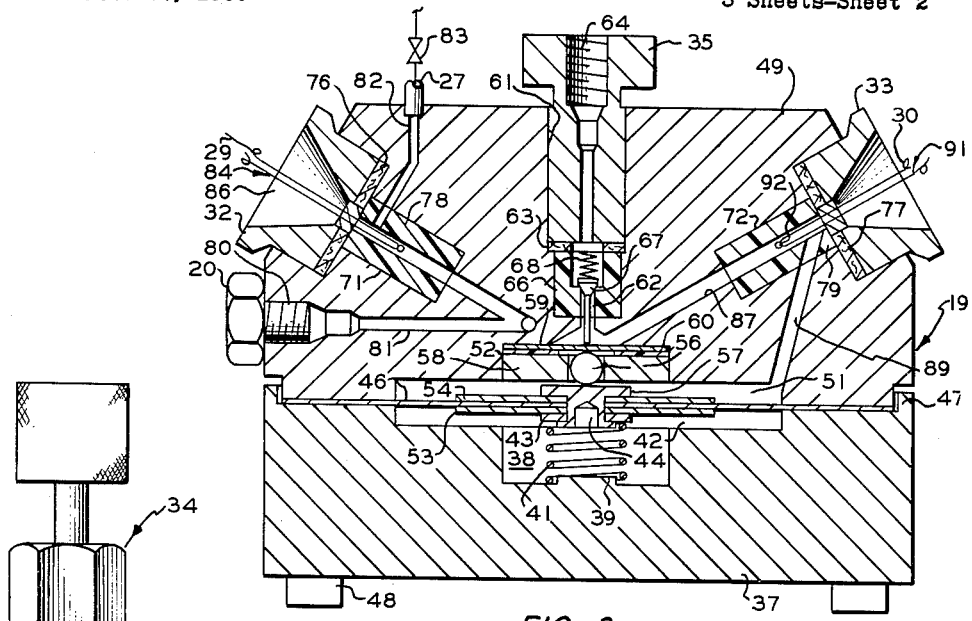

Oct. 2, 1962 E. GUENTHER 3,056,278
FLOW CONTROLLER FOR CHROMATOGRAPHIC ANALYZER
Filed Feb. 17, 1960 3 Sheets-Sheet 3

INVENTOR.
EMMERICH GUENTHER
BY
Hudson & Young
ATTORNEYS

United States Patent Office 3,056,278
Patented Oct. 2, 1962

3,056,278
FLOW CONTROLLER FOR CHROMATOGRAPHIC ANALYZER
Emmerich Guenther, Bartlesville, Okla., assignor to Phillips Petroleum Company, a corporation of Delaware
Filed Feb. 17, 1960, Ser. No. 9,216
6 Claims. (Cl. 73—23)

This invention relates to improvements in chromatography. In another aspect it relates to a high speed chromatographic analyzer involving an improved flow controller that reduces dead space volume and permits analysis in multi-column chromatographs. In still another aspect, it relates to a chromatographic analyzer having improved gas flow control and faster response for the detector component.

In gas chromatography, one or more columns containing an appropriate adsorbent, usually in pulverized form, are used to separate the various constituents of a fluid sample. After the fluid sample has been vaporized, if not naturally in the gas state, it is generally introduced upstream from a packed chromatographic column and into a carrier gas stream which serves to move the sample into the column. Under proper operating conditions, the various constituents of the gaseous sample are spatially separated, by a process of selective sorption and subsequent desorption, which is closely analogous to the mechanism of fractional distillation. Thus, the constituents are stratified in the column and a continuous displacement by the carrier gas stream causes their sequential passage therefrom in a selected order. This order is a function of the relative volatility, molecular weight, or other property affecting the degree of adsorption of the fluid constituents on the sorbent in the column.

Conventionally, as the segregated constituents emerge, they are suitably detected through the sensing of characteristic properties, such as thermal conductivity, density, refractive index, and the like, which indicate the presence of the several components and measure the relative amounts thereof. This invention is concerned with improvements in the sensing device or detector which measures thermal conductivity, the most commonly employed method.

I have found that one of the key design features to be included in the detector component, particularly where it is a thermal conductivity cell, is small detector volume, in order to insure fast response and maintain high resolution of the peaks representing the various sample components. Thermal conductivity cells are also characterized by high flow sensitivity which can be kept within acceptable limits only by careful gas flow control past the thermistor elements themselves. In a single column chromatographic analyzer, this control is obtained by placing a pressure regulator upstream from the sorption columns; however, this practice is not acceptable in multi-column, high-speed analyzers.

Nor is a standard downstream flow controller adequate in the case of a multi-column analyzer because there is frequent switching of the variable-size columns and the resultant changing of the pressure and gas flow rates will distort the recorder reading due to the characteristic flow sensitivity of the sample thermistor of the detector. Moreover, a downstream flow controller entails a substantial increase in volume ahead of the detector, which increase impairs fast response and permits a certain amount of "reshuffling" of the segregated components of the sample after leaving the column.

I have developed a detector and flow controller assembly that provides the small volume necessary between the columns and the sampling thermistor of the thermal conductivity cell in a high speed, multi-column chromatographic analyzer, at the same time that it gives the desired flow control. The columns may also be rapidly switched to permit flow past this detector, despite the varied gas flow rates. This design makes possible the operation of a multi-column, high speed, chromatographic analyzer with the sought-after speed and accuracy. The detector volume in this design is kept to a minimum consonant with maintaining the necessary temperature sensitivity of the sensing element. In my invention, the sensing elements, the flow controller valve and its actuating diaphragm, and the needle valve assembly for determining the maximum gas flow rate through the detector, are all incorporated into a single compact unit and arranged to give the optimum low volume for fast response, and a minimum of reshuffling of the separated constituents. This is accomplished by connecting the sample thermistor chamber as a part of the conduit between the diaphragm-actuated, flow controller valve and the lower diaphragm chamber, whereby the thermal conductivity measurement is made before the sample gas stream being measured is necessarily accumulated in a sufficient volume to actuate the diaphragm, but after fine flow control past the sampling thermistor has been achieved.

Accordingly, it is an object of this invention to provide an improved high speed, multi-column, chromatographic analyzer.

It is another object to provide a compact detector and fine flow control component that reduces dead chamber volume, maintains high resolution of the segregated constituents from a chromatographic column, and enables the apparatus to register sharp peaks on the recording strip for each component, which enables more accurate and easier reading thereof.

It is a further object to provide a flow controller that will minimize the distortion caused by the inherent flow sensitivity of the sensing elements of a thermal conductivity cell to the varying flow rates of the several columns of a multi-column chromatographic analyzer.

Further objects and advantages of this invention will become apparent to those skilled in the art from a study of the accompanying disclosure, appended claims, and drawing, in which:

FIGURE 3 is a detailed sectional view taken along lines 3—3 in FIGURE 2;

FIGURE 4 is a detailed sectional view taken along lines 4—4 in FIGURE 2; and

Figure 1:
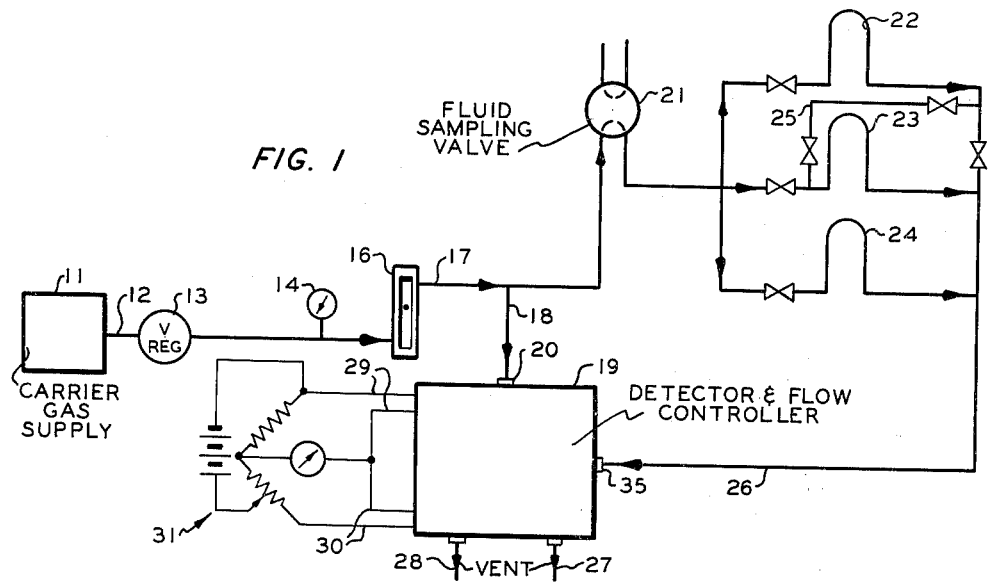
FIGURE 1 is a schematic flow diagram of a chromatographic analyzer embodying the detector and flow controller component of this invention.

Referring now to the drawings in detail, wherein like parts have been designated by like reference numerals, and to FIGURE 1 in particular, there is shown a carrier gas supply 11, having an outlet conduit 12 which passes to constant pressure outlet valve 13. Further downstream in conduit 12 is pressure gauge 14, followed by flow meter 16. Conduit 17 from the top of flow meter 16 is provided with a side conduit 18 leading to the reference side of combined detector and flow controller 19 through inlet nut 20. Further downstream conduit 17 is provided with fluid sampling valve 21. Chromatographic columns 22, 23 and 24, each being filled with an appropriate adsorbent, usually in pulverized form, are located in parallel downstream of fluid sampling valve 21. Conduit 25 is provided to permit operation of columns 22 and 23 in series, as desired. Conduit 26 leading from the chromatographic columns enters the sampling side of detector and flow controller 19. Detector 19 is provided with outlet vents 27 and 28 for venting the gas streams which flow past the reference and sampling thermistors (not shown). Flow controller 19 is further provided with two pairs of electrical leads 29 and 30, which transmit the varying electrical signal from the thermistors to the appropriate arms of a bridge circuit generally designated 31.

Figure 2:
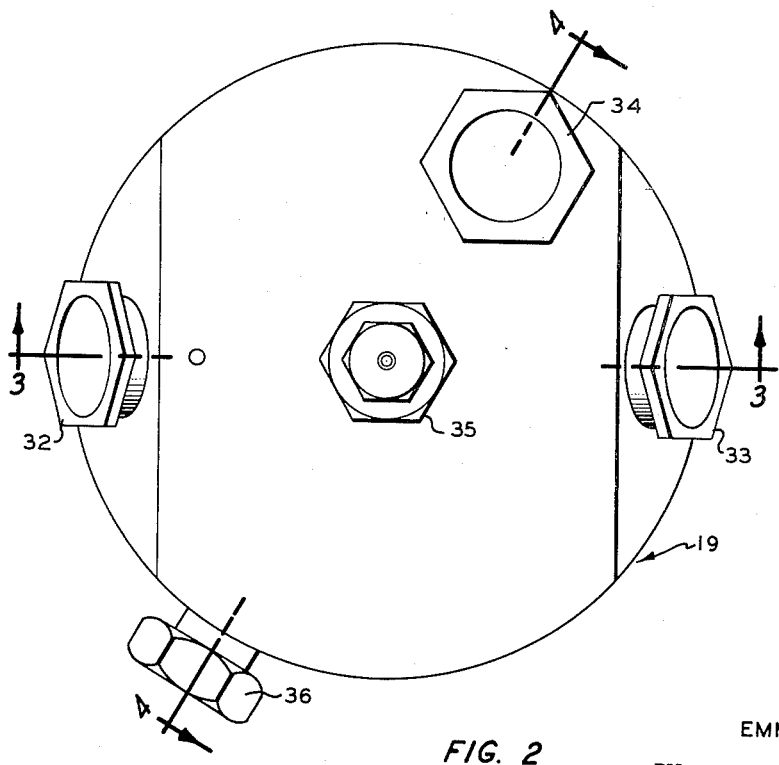
FIGURE 2 is a top plan view of the detector of FIGURE 1.

In FIGURE 2 there is shown a top plan view of the detector and flow controller unit of this invention. Detector 19 is provided with a pair of inlet packing nuts, 32 and 33, threadedly mounted in an inclined position into the top portion thereof. A needle valve assembly 34 is mounted in the top portion of the detector, and another inlet nut 35 is threadedly secured in a vertical position in the upper portion of detector 19. A fourth inlet nut 36 is threadedly mounted in horizontal position in the side of the detector.

In FIGURE 3 is shown a sectional view of this invention taken along lines 3—3 of FIGURE 2. A generally cylindrical metal block 37, preferably of stainless steel or the like for corrosion resistance, is provided with a generally cylindrical shaped chamber 38 disposed in the middle thereof. A lug 39 is provided in the bottom of chamber 38 to retain a spring 41 in a central position therein. Spring 41 is designed for a three pound pressure differential across the diaphragm. Lower block 37 is counter-bored to provide a second chamber 42 which is narrower but of substantially larger diameter than the adjacent chamber 38. A diaphragm assembly 43 is disposed on top of lower block 37 and is provided with a recess 44 on its lower side for receiving the upper end of spring 41. The diaphragm 46 of assembly 43 is of a diameter substantially larger than chamber 42 and extends to the outer edge of block 37, being flanged against the outer rim 47 thereof. Block 37 is provided with a plurality of bolts, such as 48, which secure it to a second metal block 49. Upper block 49 is spaced from block 37 at its center by a narrow chamber 51 of the same diameter as chamber 42 in block 37. Block 49 is provided with another generally cylindrical chamber 52 adjacent to chamber 51, but deeper and of a smaller diameter comparable to that of chamber 38 in block 37. Diaphragm 46 is provided with a pair of reinforcing plates 53 and 54 adjacent to the center of the diaphragm. A steel ball bearing 56 sits on top of disc-fastening member 57 of diaphragm assembly 43, and is maintained in a central position within chamber 52 by bushing 58. Metal bushing 58 is spaced from the upper surface of chamber 52 by small metal diaphragm 59 and a gasket 60. Gasket 60 is composed of a plastic material of high temperature and corrosion resistance, such as Teflon.

Block 49 is provided with a vertical, cylindrical chamber 61 extending downward from the top of block 49 but short of the top of chamber 52. A vertical passage 62 is provided between the bottom surface chamber 61 and the upper side of diaphragm 59 in chamber 52. A threadedly mounted inlet nut 35 is disposed in chamber 61. Inlet nut 35 is spaced from the recessed shoulders of chamber 61 by a thin sealing gasket 63. Inlet nut 35 is further provided with an axial passage 64 connecting the lower portion of chamber 61 with an area external of block 49. A plastic bushing 66, similar to the material of bushing 58, is disposed in the lower portion of chamber 61. Bushing 66 is provided with a valve seat that is adapted to receive the head and upper portion of a valve pin 67 and a spring 68. Spring 68 is biased to retain valve pin 67 seated in the lower portion of bushing 66. Alternatively, movement of diaphragm assembly 43 upward by spring 41, as transmitted through ball bearing 56 and small diaphragm 59, tends to move valve pin 67 off the valve seat within bushing 66.

A pair of inclined cylindrical chambers 71 and 72 are provided in block 49. Each of these chambers are counter-bored and threaded to receive a pair of threaded inlet nuts 32 and 33. Nuts 32 and 33 are spaced from the recessed shoulders of chambers 71 and 72 by sealing gaskets 76 and 77. Plastic bushings 78 and 79, similar in composition to bushings 58 and 66, are fitted tightly in the lower portions of chambers 71 and 72. An inlet passage 80, counter-bored to receive inlet nut 20, connects via passage 81 with the bottom portion of chamber 71. An outlet passage 82 communicates between the upper portion of chamber 71 and external valve 83. A thermistor assembly generally designated 84, with suitable electrical leads 29 to the reference side of bridge circuit 31 is mounted through the passage 86 provided in inlet nut 32 into the reduced volume of chamber 71. Passage 87 in block 49 connects passage 62, which terminates above diaphragm 59, with the lower end of inclined chamber 72. A second passage 89 is provided between the middle portion of chamber 72 and cylindrical chamber 51. Another thermistor assembly generally designated 91 is mounted through passage 92 of inlet nut 33 into chamber 72 within bushing 79. The thermistor bead 92 of thermistor 91 is disposed intermediate the ends of passages 87 and 89. Thermistor assembly 91 is provided with suitable electrical leads 30 leading to the sampling arm of a bridge circuit 31.

By large area for diaphragm 46 is meant one having over 100 times the cross-sectional area of passages 87, 89 or 62.

In FIGURE 4 there is shown another cross-sectional view of the detector of this invention taken along the lines 4—4 of FIGURE 2. Upper block 49 is provided with a vertical cylindrical chamber 96 extending from the upper surface thereof terminating intermediate the upper and lower sides of block 49. Chamber 96 is threaded to receive a threadedly mounted needle valve assembly 34. A passage 97 connects chamber 51 of block 49 with the edge of the lower portion of chamber 96. Another passageway 98 communicates between the lower end of chamber 96 in upper block 49 and chamber 42 in lower block 37. Needle 99 of needle valve assembly 34 is disposed within the upper end of passageway 98, and can be adjusted to control the maximum flow therethrough.

Lower block 37 is provided with a horizontal cylindrical chamber 101 extending from the exterior of the block and threaded to receive a threadedly mounted inlet nut 36. A pasageway 102 connects chamber 38 with the inner end of chamber 101.

Figure 5:
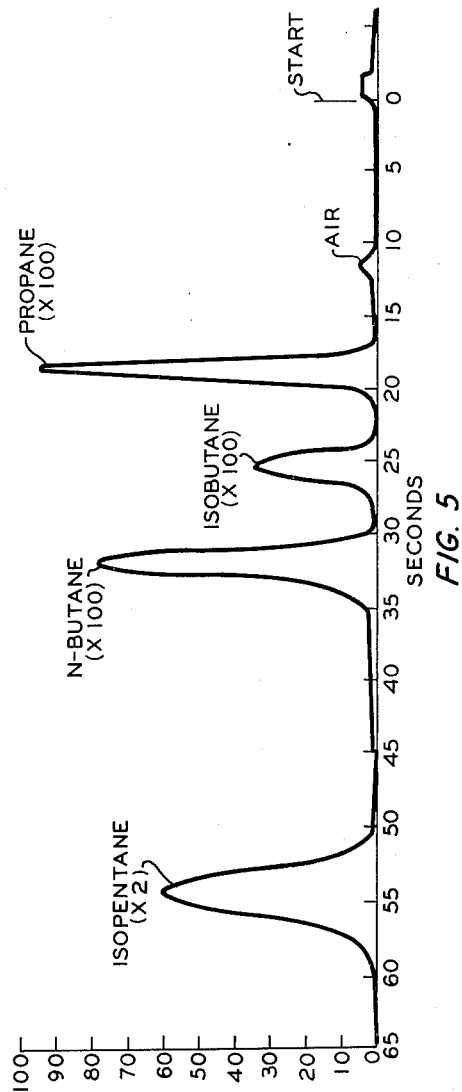
FIGURE 5 is a graphic illustration of an analysis made with the analyzer of FIGURE 1.

In FIGURE 5 is shown the results of analyzing a sample of hydrocarbon gas using helium as carrier gas. The analysis requires only one minute and using the peak height method for converting the data shows that the sample contained approximately 46 mol percent propane, 17 mol prcent isobutane and 37 mol percent normal butane. The combined air and isopentane amounted to less than one mol percent of the sample. This chromatogram shows the fine resolution of the peaks that can be achieved in a chromatographic analyzer employing the thermal conductivity cell of this invention.

In operation, a carrier gas stream from one of the chromatographic columns 22, 23, or 24 enters detector 19 through passageway 64 in inlet nut 35. The tension in spring 41 biases diaphragm assembly 43, ball bearing 56, and diaphragm 59 upward, and valve pin 67 clear of the valve seat within bushing 66, thus permitting gas to flow through passageway 62, passageway 87 to chamber 72, past thermistor bead 92, through passage 89, and into chamber 51. When sufficient gas has accumulated in chamber 51, it will exert enough downward pressure on diaphragm assembly 43 to overcome the tension in spring 41. Thus, the diaphragm assembly 43, ball bearing 56 and valve pin 67 will move downward, with the latter seating tightly within bushing 66 by the force of spring 68. The gas accumulated in chamber 51 exists through passage 97, past needle restriction 99 in chamber 96, and through passage 98 into chamber 42. The near equalization of the gas pressure on both sides of diaphragm assembly 43 will permit spring 41 to move diaphragm assembly 43 upward, and once again lift the valve pin off its seat, as described. The gas in adjacent chambers 42 and 38 is vented via passage 102 and chamber 101. As the diphragm mechanism is highly sensitive to pressure changes, very slight variations in the inlet gas rate will result in a compensating, automatic adjustment in the valve opening, giving the high degree of flow control past the sampling thermistor which is desired. Needle valve 99 can be set so as to determine the maximum gas flow rate from the column through the detector and flow controller.

As indicated previously, gas flow past reference thermistor 84 enters through side conduit 18 off main carrier gas conduit 17. Reference chamber 71 can be operated either as a total diffusion cavity or by permitting direct flow therethrough. This is achieved by maintaining external valve 83 on outlet passage 82 from chamber 71 in either an open or closed position, as preferred. If valve 83 is open, carrier gas flow past thermistor 84 is of the direct type, while if it is closed, flow is of the straight diffusion cavity type. Either type may be used to give a reference signal that is transmitted to bridge circuit 31.

In view of the foregoing description of a preferred embodiment of the apparatus of this invention, it can be seen that there is provided a compact assembly adapted to measure the thermal conductivity of the segregated components from a chromatographic column, while closely regulating the flow rate of that gas stream. While this invention has been described in conjunction with the present preferred embodiment, it should be apparent that the invention is not limited thereto.

What is claimed is:

1. A detector and flow controller for a gas stream comprising in combination an inlet valve normally biased open, means to overcome said bias and tend to close said valve and thereby regulate flow through said valve, comprising first and second gas pressure chambers separated by a flexible diaphragm of large area, means for transmitting force from said diaphragm to said valve, a first conduit connecting the downstream end of said valve with said first chamber, said first chamber being positioned relative to said diaphragm so that gas pressure therein tends to close said valve, a thermal conductivity detector cell disposed in said first conduit, a second conduit containing an adjustable area orifice connecting said first and second chambers, and a first outlet conduit communicating between said second chamber and a region exterior of said detector, whereby the volume of gas in said first conduit is reduced to a minimum, the flow therethrough is closely regulated, and the thermal detector is in the gas stream before it expands into said gas pressure chamber.

2. A detector and flow controller for a gas stream comprising in combination an inlet valve normally biased open, means to overcome said bias and tend to close said valve and thereby regulate flow through said valve, comprising first and second gas pressure chambers separated by a flexible diaphragm of large area, means for transmitting force from said diaphragm to said valve, a first conduit connecting the downstream end of said valve with said first chamber, said first chamber being positioned relative to said diaphragm so that gas pressure therein tends to close said valve, a thermal conductivity detector cell disposed in said first conduit, a second conduit containing an orifice connecting said first and second chambers, and a first outlet conduit communicating between said second chamber and a region exterior of said detector, whereby the volume of gas in said first conduit is reduced to a minimum, the flow therethrough is closely regulated, and the thermal detector is in the gas stream before it expands into said gas pressure chamber.

3. The apparatus of claim 2 in combination with a second thermal conductivity detector cell disposed in a third conduit, means to supply a sample containing carrier gas stream to the inlet of said inlet valve, means to supply carrier gas to said third conduit, said first and second detectors being disposed as arms of an electrical bridge circuit connected in series with two impedances at four junctions, means to apply electrical potential across two opposite junctions, and means to read the potential between the other two opposite junctions.

4. An apparatus for high speed detection of a characteristic property of the components of a gas mixture comprising, in combination; a carrier gas supply source; a fluid sampling valve; a first conduit communicating between said carrier gas supply source and said sampling valve; a sample fluid supply source in communication with said sampling valve; a chromatographic column; a second conduit communicating between said sampling valve and the inlet of said column; a third conduit in communication with the outlet of said column, a rate of flow controller in said third conduit, said flow controller further comprising, in combination, an inlet valve normally biased open, motor means to overcome said bias and tend to close said valve and thereby regulate flow through said inlet valve, further comprising, first and second gas pressure chambers separated by a flexible diaphragm of large area; means for transmitting force from said diaphragm to said valve; a first passage connecting the downstream end of said valve with said first chamber, said first chamber being positioned relative to said diaphragm so that gas pressure therein tends to close said valve; a second passage containing an adjustable area orifice communicating between said first and second chambers; and a fifth outlet conduit communicating between said second chamber and a region exterior of said apparatus; a first detector means disposed within said first passage adapted to sense the successive appearance of the different components of said gas mixture; a third passage located within the body of said flow controller, both ends of which communicate with a region external of said controller; a second detector means disposed within said third passage means; a sixth conduit to supply carrier gas to said third passage means; said first and second detector means being disposed as arms of an electrical bridge circuit connected in series with two impedances at four junctions; means to apply electrical potential across two opposite junctions; and means to read the potential between the other two opposite junctions.

5. Detector and flow controller for a high speed, multicolumn chromatographic analyzer, comprising in combination, a first block having a first chamber therein, said first block having a first passage therein extending between said first chamber and a region exterior of said first block, said first block having a narrower and larger diameter second chamber adjacent to said first chamber, a first spring biasing means disposed in said first and said second chambers tending to move a first diaphragm means upwards, a second block abutting and bolted to said first block at the edges thereof but spaced from said first block at the center by a narrow third chamber in said second block which is adjacent said narrow second chamber in said first block, said second block having a fourth chamber deeper and of smaller diameter than said third chamber and adjacent thereto, said first diaphragm means positioned between said first and said second blocks, a second diaphragm means positioned in the base of said fourth chamber, mechanical means for transmitting the upward force of said first diaphragm means to said second diaphragm means, said second block having a fifth chamber therein spaced from said fourth chamber and a threadedly mounted first inlet nut disposed therein, said first inlet nut provided with an axial passage for communicating between said fifth chamber and a region exterior of said second block, a second passage defined in part by a valve seat and connecting said fourth and fifth chambers, said second passage adapted to receive a valve means disposed below said first inlet nut and confined within said second passageway, a second spring biasing means disposed in said second passage tending to close said valve mean, while said valve means is normally biased open by said second diaphragm means, a third passage disposed in said first and second blocks, said third passage having an inlet end communicating with said third chamber in said second block and an outlet end communicating with said second chamber in said first block, said third passage having a gas flow adjusting means therein, a sixth and seventh chambers disposed in said second block and angularly inclined to the vertical sides of said detector, said sixth chamber provided with a second inlet nut threadedly seated against the recessed shoulders of the upper portion of said sixth chamber, said second inlet nut provided with an axial passage adapted to receive a first thermistor element, a fourth passage disposed in said second block having an inlet end communicating with said carrier gas supply conduit and an outlet end communicating with the lower end of said sixth chamber, said seventh chamber provided with a third inlet nut threadedly seated against the recessed shoulders in the upper portion of said seventh chamber, said third inlet nut provided with an axial passage adapted to receive a second thermistor element, a fifth passage disposed in said second block and having an inlet end communicating with the lower end of said second passage and an outlet end communicating with the lower portion of said seventh chamber, a sixth passage disposed in said second block and having an inlet end communicating with the middle portion of said seventh chamber and an outlet end communicating with said third chamber of said second block, electrical leads from said thermistor elements leading to a conventional bridge circuit.

6. Detector and flow controller for a high speed, multi-column chromatographic analyzer, comprising in combination, a first block having a first chamber therein, said first block having a first passage therein extending between said first chamber and a region exterior of said first block, a first outlet nut threadedly mounted in said first passage, said first block having a narrower and larger diameter second chamber adjacent to said first chamber, a first compression spring disposed in said first and second chambers tending to move a first diaphragm upward, a second block abutting and bolted to said first block at the edges thereof but spaced from said first block at the center by a narrow third chamber in said second block which is adjacent said narrow second chamber in said first block, said second block having a fourth chamber deeper and of smaller diameter than said third chamber and adjacent thereto, said first diaphragm positioned between said first and second blocks, said first diaphragm having a pair of reinforcing plates adjacent the center thereof, a steel ball bearing disposed in said fourth chamber and adjacent to the upper of said reinforcing plates in said third chamber, a first metal bushing surrounding said ball bearing and seating tightly on its periphery in said fourth chamber, a thin first sealing gasket disposed between said first bushing and a second metal diaphragm, said second diaphragm adjacent said first gasket and the base of said fourth chamber, said second block having a fifth chamber therein spaced from said fourth chamber and a threadedly mounted first inlet nut disposed therein, a thin second sealing gasket between said first inlet nut and recessed shoulders of said fifth chamber, said first inlet nut provided with an axial passage for communicating between said fifth chamber and a region exterior of said second block, a second plastic bushing adapted to fit tightly in the lower portion of said fifth chamber, a second passage defined in part by a valve seat in said second bushing and connecting said fourth and fifth chambers, said second passage adapted to receive a valve pin of a valve assembly disposed below said first inlet nut and confined within said second passageway, the valve head on said valve pin engageable with said valve seat, a second compression spring disposed in said second passage tending to seat said valve head, said valve pin is normally biased in an unseated position by said second diaphragm, a third passage disposed in said first and second blocks, said third passage having an inlet end communicating with said third chamber in said second block and an outlet end communicating with said second chamber in said first block, said third passage having an adjustable needle valve therein, a sixth and seventh chambers disposed in said second block and angularly inclined to the vertical sides of said detector, said sixth chamber provided with a second inlet nut threadedly seated against recessed shoulders of the upper portion of said sixth chamber, a thin third sealing gasket between said second inlet nut and said shoulders, said second inlet nut provided with an axial passage adapted to receive a first thermistor element, a third plastic bushing surrounding said thermistor element and seating tightly in the lower portion of said sixth chamber, a fourth passage disposed in said second block having an inlet end communicating with said carrier gas supply conduit and an outlet end communicating with the lower end of said sixth chamber, said seventh chamber provided with a third inlet nut threadedly seated against the recessed shoulders in the upper portion of said seventh chamber, a thin fourth sealing gasket between said third inlet nut and said shoulders, said third inlet nut provided with an axial passage adapted to receive a second thermistor element, a fourth plastic bushing surrounding said second thermistor element and seating tightly in the lower portion of said seventh chamber, a fifth passage disposed in said second block and having an inlet end communicating with the lower end of said second passage and an outlet end communicating with the lower portion of said seventh chamber, a sixth passage disposed in said second block and having an inlet end communicating with the middle portion of said seventh chamber and an outlet end communicating with said third chamber of said second block, electrical leads from said thermistor elements leading to a conventional bridge circuit, whereby the volume of gas in said second and fifth passages and said seventh chamber is reduced to a minimum, and the gas flow therethrough is closely regulated.

References Cited in the file of this patent

UNITED STATES PATENTS

| | | |
|---|---|---|
| 1,904,819 | Blodgett | Apr. 18, 1933 |
| 2,468,768 | Malick | May 3, 1949 |
| 2,833,151 | Harvey | May 6, 1958 |

OTHER REFERENCES

Gas Chromatography by Keulmans; published by Reinhold Pub. Corp., New York, 1957. (Copy in Div. 36—page 11, FIG. 1.2 of interest.)